US008005508B2

(12) United States Patent
Miyazaki et al.

(10) Patent No.: US 8,005,508 B2
(45) Date of Patent: Aug. 23, 2011

(54) PORTABLE TERMINAL DEVICE INCORPORATING NON-CONTACT IC CARD

(75) Inventors: Akihiko Miyazaki, Yokohama (JP); Jun Anzai, Yokohama (JP)

(73) Assignee: Panasonic Corporation, Osaka (JP)

( * ) Notice: Subject to any disclaimer, the term of this patent is extended or adjusted under 35 U.S.C. 154(b) by 607 days.

(21) Appl. No.: 11/994,274

(22) PCT Filed: Jun. 28, 2006

(86) PCT No.: PCT/JP2006/312912
§ 371 (c)(1),
(2), (4) Date: Dec. 28, 2007

(87) PCT Pub. No.: WO2007/001030
PCT Pub. Date: Jan. 4, 2007

(65) Prior Publication Data
US 2009/0209289 A1    Aug. 20, 2009

(30) Foreign Application Priority Data
Jun. 29, 2005   (JP) ................................. 2005-189851

(51) Int. Cl.
H04B 1/38       (2006.01)
H04M 1/00       (2006.01)
G08B 13/14      (2006.01)
G08B 21/00      (2006.01)
G06K 5/00       (2006.01)
G06K 19/06      (2006.01)
G06K 7/08       (2006.01)

(52) U.S. Cl. ..................... 455/558; 455/556.1; 340/540; 340/572.1; 235/380; 235/492; 235/451

(58) Field of Classification Search .................. 455/558, 455/556.1; 340/540, 572.1; 235/380, 492, 235/451
See application file for complete search history.

(56) References Cited

U.S. PATENT DOCUMENTS
6,687,800 B1    2/2004  Nassor
(Continued)

FOREIGN PATENT DOCUMENTS
EP          1026623 A1    8/2000
(Continued)

OTHER PUBLICATIONS
Extended European Search Report mailed Sep. 30, 2009 in corresponding European Patent Application No. 06767529.8.
(Continued)

Primary Examiner — Temesgh Ghebretinsae
Assistant Examiner — Bobbak Safaipour
(74) Attorney, Agent, or Firm — Seed IP Law Group PLLC

(57) ABSTRACT

In a portable terminal 10 incorporating a non-contact IC 20, the non-contact IC 20 includes a card appli storage region 24 in which a card appli is stored, and the portable terminal 10 includes an appli storage region 15 in which appli's inclusive of the card appli are stored. When the non-contact IC 20 executes non-contact communication with an external R/W 30 to store the card appli selected by the external R/W 30 in the card appli storage region, a storage region for the card appli is ensured in such a manner that the card appli already stored in the appli storage region 24 is saved into the appli storage region 15. The saving of the card appli stored in the card appli storage region 24 of the non-contact IC 20 is executed using a trilateral communicating function.

13 Claims, 5 Drawing Sheets

U.S. PATENT DOCUMENTS

| | | | |
|---|---|---|---|
| 7,204,426 B2 * | 4/2007 | Sato et al. | 235/492 |
| 7,537,166 B2 * | 5/2009 | Anson et al. | 235/462.46 |
| 7,753,282 B2 * | 7/2010 | Kojima | 235/492 |
| 2004/0050932 A1 | 3/2004 | Fukada | |
| 2004/0110533 A1 * | 6/2004 | Yamagata et al. | 455/558 |
| 2004/0152489 A1 * | 8/2004 | Kikuchi et al. | 455/559 |
| 2004/0262384 A1 * | 12/2004 | Nishida et al. | 235/382 |
| 2005/0108317 A1 * | 5/2005 | Someya et al. | 709/200 |
| 2005/0220060 A1 * | 10/2005 | Takusagawa et al. | 370/338 |
| 2006/0083243 A1 * | 4/2006 | Igarashi et al. | 370/392 |
| 2006/0213991 A1 * | 9/2006 | Koizumi | 235/451 |
| 2007/0138282 A1 * | 6/2007 | Kojima | 235/451 |
| 2008/0039134 A1 * | 2/2008 | Hattori et al. | 455/556.1 |
| 2008/0280648 A1 * | 11/2008 | Miyagawa et al. | 455/558 |
| 2009/0033488 A1 * | 2/2009 | Suzuki et al. | 340/540 |
| 2009/0065582 A1 * | 3/2009 | Kon et al. | 235/439 |

FOREIGN PATENT DOCUMENTS

| | | |
|---|---|---|
| EP | 1465124 A2 | 10/2004 |
| EP | 1521201 A1 | 4/2005 |
| EP | 1610245 A1 | 12/2005 |
| JP | 2003060748 A | 2/2003 |
| JP | 2004110320 A | 4/2004 |
| JP | 2004193722 A | 7/2004 |
| JP | 2004193808 A | 7/2004 |
| JP | 2005108044 A | 4/2005 |
| WO | 02/10889 A2 | 2/2002 |
| WO | 03038744 A1 | 5/2003 |
| WO | 2004079616 A1 | 9/2004 |

OTHER PUBLICATIONS

Communication pursuant to Article 94(3) EPC mailed on Jan. 10, 2011, in corresponding EP Application No. 06767529, 7 pages.

* cited by examiner

FIG. 2(a)

| REGISTERED AID | DATA SIZE | NUMBER OF TIMES OF USE | CARD APPLI STORAGE PLACE | DATA STORAGE PLACE |
|---|---|---|---|---|
| CARD APPLI B : 654321 | 5Kbytes | 5 | #1 | |
| CARD APPLI C : 555555 | 3Kbytes | 3 | #1 | |
| CARD APPLI A : 123456 | 2Kbytes | 2 | #2 | #3 |

FIG. 2(b)

| MANAGGED AID | DATA SIZE |
|---|---|
| CARD APPLI A : 123456 | 2Kbytes |

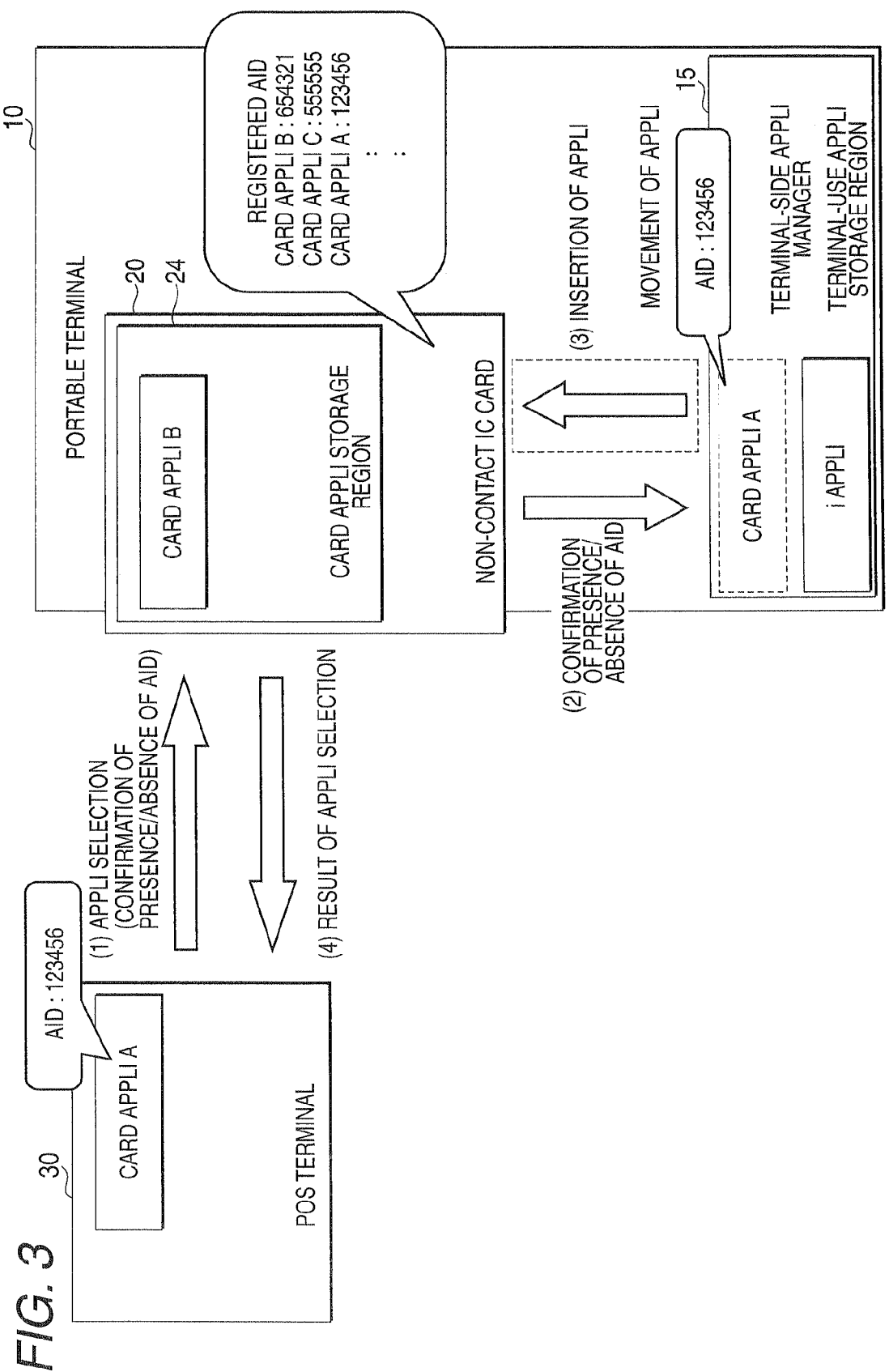

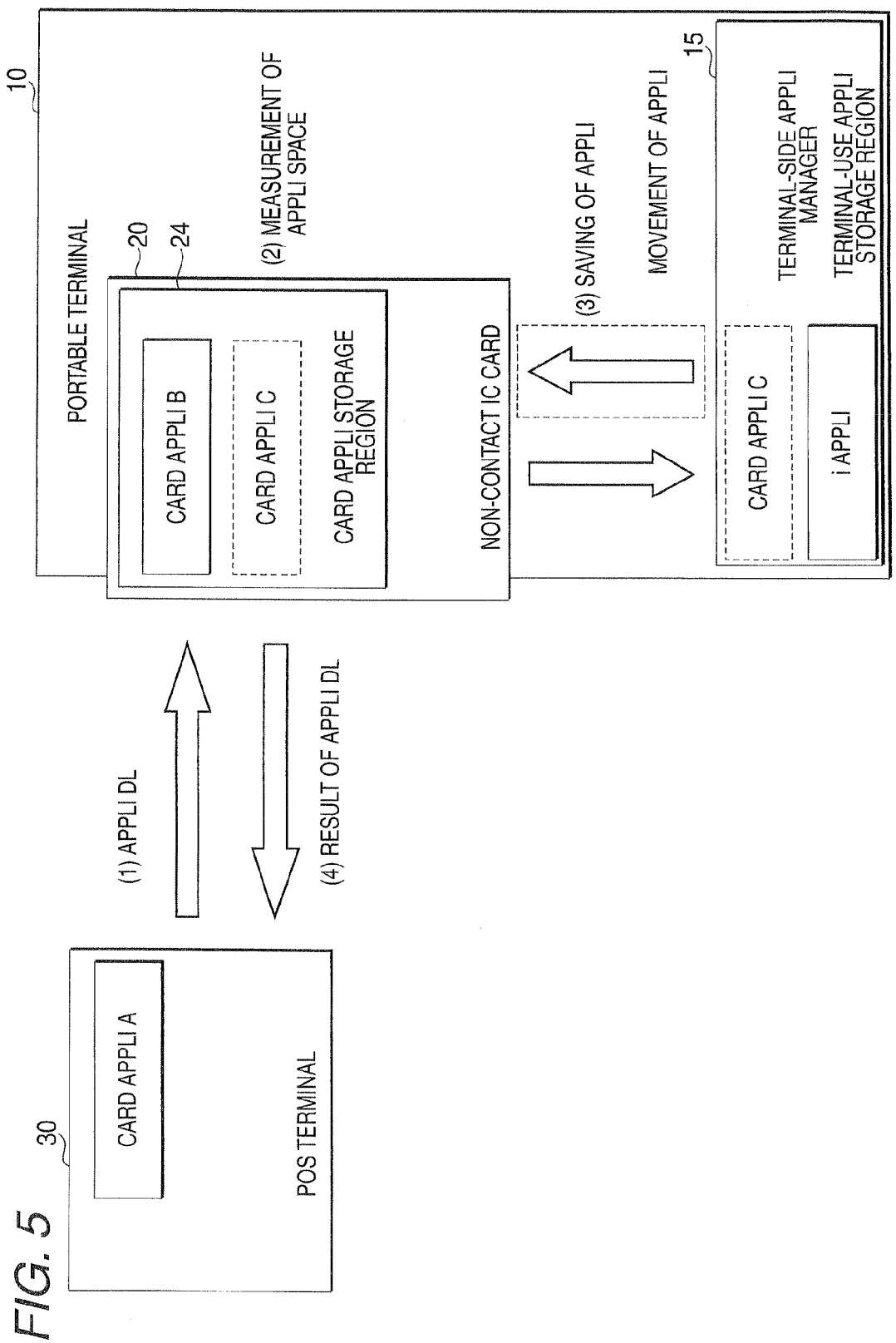

PORTABLE TERMINAL DEVICE INCORPORATING NON-CONTACT IC CARD

TECHNICAL FIELD

This invention relates to a portable terminal device incorporating the function of a non-contact IC card for performing non-contact communication with an external reader/writer (hereinafter referred to as an "R/W") and more particularly to a portable terminal device capable of automatically installing a card application (hereinafter the application is simply referred to as "appli") in the non-contact IC card.

BACKGROUND ART

An IC card has a data processing function and an information storage region in a body and so provides a high concealment performance. In recent years, by mounting the IC card in a portable terminal such as a cellular phone or PDA or embedding an IC chip having an IC card function in the portable terminal, the function of the portable terminal has been extended.

Further, as described in the following Patent Reference 1, portable terminals also emerge in which as the IC card, a non-contact IC card having a non-contact communication function for an external R/W is mounted or a non-contact IC card chip is embedded. In this specification, these portable terminals are referred to as non-contact IC incorporated portable terminals.

Where a card appli for electronic cash banking has been installed in the non-contact IC mounted in the portable terminal, by shading a POS terminal serving as the external R/W with the portable terminal, it is possible to pay a commodity buying charge using the electronic cash. At this time, a paying history and balance data are recorded in the data storage region of the non-contact IC. Further, where a card appli for a commuter ticket has been installed in the non-contact IC, by shading a ticket gate machine serving as the external R/W with the portable terminal, a person can pass through the ticket gate machine.

In the non-contact IC incorporated portable terminal, as described in the Patent Reference 1, the processing performed between the external R/W and the non-contact IC and the processing the non-contact IC and the portable terminal can be connected with each other. For example, when the banking processing of electronic cash is performed between the non-contact IC and the POS terminal, the portable terminal can perform the processing of acquiring the balance information from the non-contact IC to display the balance on the display screen of the portable terminal. In this way, three parties of the external R/W, non-contact IC and portable terminal can perform collaborated processing. This is called a trilateral communicating function or a trilateral collaborating function.

The non-contact IC can store a plurality of card appli's within a permissible range in the storage space. The external R/W specifies the card appli to be launched for the non-contact IC having entered its communication zone and the non-contact IC launches the card appli specified. Thus, non-contact communication processing for enjoying the service by the external R/W is started. In this case, it should be noted that if the non-contact IC does not have the card appli specified, it cannot enjoy the service by the external R/W.

The following Patent Reference 2 discloses a method for installing a new card appli in the IC card mounted in the portable terminal.

This method is executed using an IC card incorporating an IC card chip and a large capacity memory card chip. When a card holder makes launching processing for a card appli getting request, the portable terminal acquires the requested card appli from an IC card program issuing/managing server. If there is a necessary free space in the storage region of the IC card chip, the card appli is stored in the IC card chip. If there is no necessary free space, one or plural card appli's selected by the card holder is moved to the memory card chip and removed from the IC card chip. Thus, after the necessary free space is ensured in the IC card chip, the new card appli is stored in the IC card chip.

In this case, if the information stored by the card appli removed (e.g. banking history and balance data) must be saved, this information is taken out from the IC card chip and stored in the memory card chip.

The card appli moved from the memory card chip, when the card holder selects its use, is stored in the IC card chip again and used.

Patent Reference 1: JP-A-2003-60748
Patent Reference 2: JP-A-2004-110320

DISCLOSURE OF THE INVENTION

Problems that the Invention is to Solve

In the case of the non-contact IC incorporated portable terminal, in order to enhance its usefulness, it is necessary that the card appli not initially registered in the non-contact IC can be installed later.

However, since the method of storing the card appli described in the Patent Reference 2 is a system in which the card holder selects the card appli to be downloaded, card appli to be removed and card appli to be launched, respectively, it is not suitable for the non-contact IC incorporated portable terminal.

The non-contact IC incorporated portable terminal is desired to have such maneuverability that for example, when the external R/W is shaded with the portable terminal, unless the non-contact IC has the card appli specified by the external IC, it can instantaneously acquire this card appli and execute the non-contact communication for enjoying the service by the external RAN.

In view of the above circumstance, this invention has been accomplished. An object of this invention is to provide a non-contact IC incorporated portable terminal capable of effectively installing a new card appli in the non-contact IC using a trilateral communicating function.

Means for Solving the Problems

In accordance with this invention, there is provided a non-contact IC incorporated portable terminal, wherein the non-contact IC includes a card appli storage unit in which a card appli is stored and a card manager for controlling the storage of the card appli in the card appli storage unit and saving the card appli from the card appli storage unit; the portable terminal device includes an appli storage unit in which appli's inclusive of the card appli are stored; and when the non-contact IC executes non-contact communication with an external R/W to store the card appli selected by the external R/W in the card appli storage unit, using a trilateral communicating function, the card manager saves the card appli already stored in the appli storage unit into the appli storage unit, thereby ensuring a storage region for the card appli.

In order to ensure a necessary space in the card appli storage unit of the non-contact IC, using the trilateral communicating function, another card appli stored in the card appli storage unit is saved.

In the non-contact IC incorporated portable terminal, when the non-contact IC executes non-contact communication with an external R/W to store the card appli selected by the external R/W in the card appli storage unit, the card manager installs the card appli from the appli storage unit using a trilateral communicating function.

Where a card appli for enjoying the service provided by the external RAN has been preserved in the portable terminal, the card appli is downloaded from the portable terminal into the non-contact IC.

Further, in the non-contact IC incorporated portable terminal according to this invention, the card appli to be installed in the card appli storage unit is downloaded from the external R/W.

Where a card appli for enjoying the service provided by the external R/W is not preserved in both the non-contact IC and the portable terminal, the card appli is downloaded from the external R/W.

In the non-contact IC incorporated portable terminal according to this invention, the non-contact IC further includes an appli identifier registering unit in which an appli identifier of the card appli downloaded in the non-contact IC is registered, and the portable terminal further includes an appli identifier managing unit in which an appli identifier of the card appli stored in the appli storage unit is registered.

The non-contact IC can know, from the appli identifier registered in the appli identifier registering unit, whether or not the card appli selected by the external R/W has been already downloaded.

In the non-contact IC incorporated portable terminal according to this invention, the card appli to be saved from the card appli storage unit is selected on the basis of the frequency in use of the card appli.

The card appli with a lower frequency in use is selected as an object to be saved.

In the non-contact IC incorporated portable terminal according to this invention, in order that the number of the card appli's to be saved from the card appli storage unit is minimum, the card appli to be saved is selected on the basis of the data size of the card appli.

Since there is a small number of card appli's to be saved, the processing of saving can be executed in a short time.

In the non-contact IC incorporated portable terminal according to this invention, if the object to be saved is not uniquely decided, the card appli to be saved from the card appli storage unit is selected on the basis of the frequency in use of the object to be saved.

A small number of card appli's with a lower frequency in use is selected as an object to be saved.

In the non-contact IC incorporated portable terminal according to this invention, the data contained in the card appli saved from the card appli storage unit is preserved in the non-contact IC.

Therefore, security of the data is guarded.

Advantage of the Invention

The non-contact IC incorporated portable terminal according to this invention can install a necessary card appli using a trilateral communicating function even if the non-contact IC does not have a card appli for enjoying the service by an external IC where a user shades the external R/W with the portable terminal.

The installing of the card appli is executed with no user's consciousness and a storage region for installing can be automatically ensured by saving the card appli.

BRIEF DESCRIPTION OF THE DRAWINGS

FIG. 2 is a registering table (a) and a managing table (b) of AID in an embodiment of this invention.

FIG. 3 is a view showing the operation of a non-contact IC incorporated portable terminal according to an embodiment of this invention (where a card appli is installed from the portable terminal into the non-contact IC).

FIG. 5 is a view showing the operation of a non-contact IC incorporated portable terminal according to an embodiment of this invention (where a card appli is installed from an external R/W into the non-contact IC).

Figure 1:
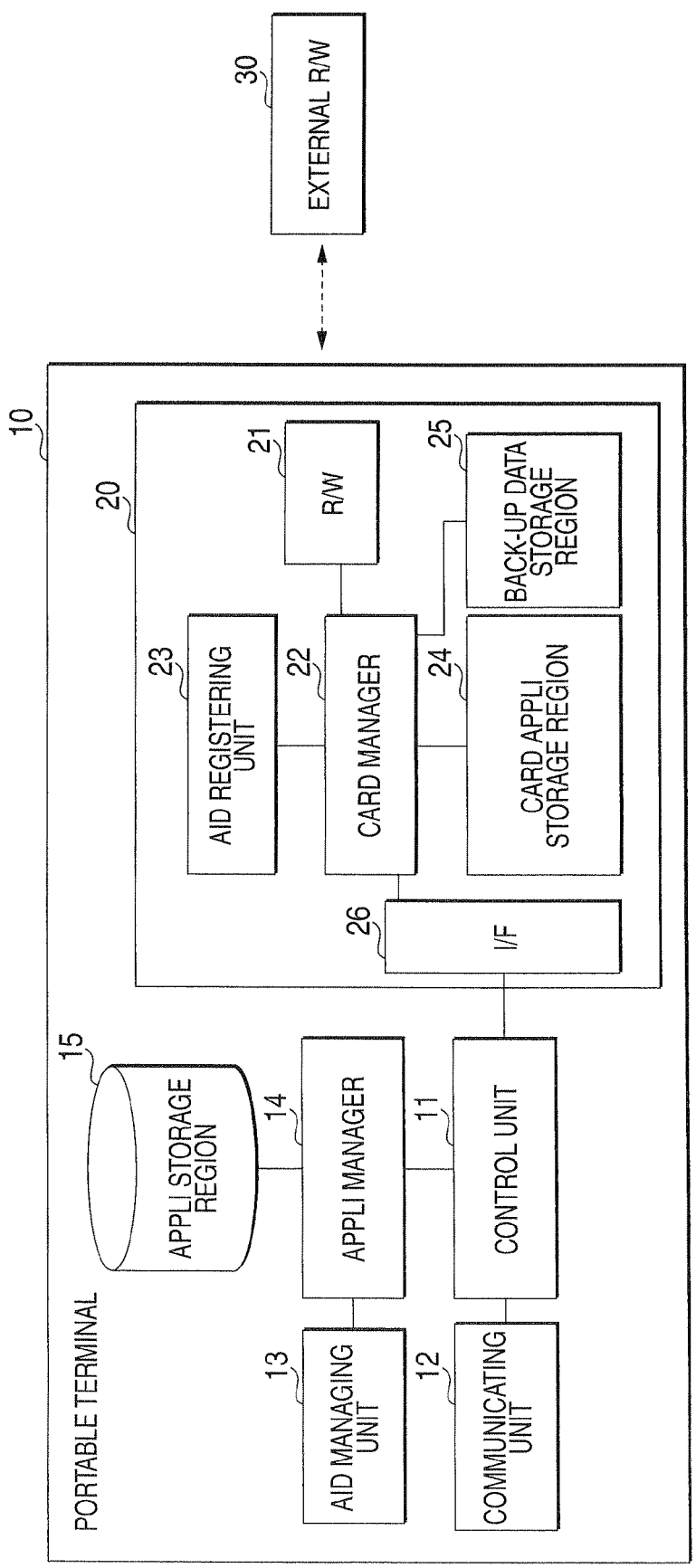
FIG. 1 is a block diagram showing the arrangement of a non-contact IC incorporated portable terminal according to an embodiment of this invention.

DESCRIPTION OF REFERENCE NUMERALS AND SIGNS 10 portable terminal
11 control unit
12 communicating unit
13 AID managing unit
14 appli manager
15 appli storage region
20 non-contact IC
21 R/W
22 card manager
23 AID registering unit
24 card appli storage region
25 back-up data storage region
26 I/F unit
30 external R/W

BEST MODE OF CARRYING OUT THE INVENTION

FIG. 1 is a block diagram showing a non-contact IC incorporated portable terminal according to an embodiment of this invention.

A portable terminal 10 incorporating a non-contact IC 20 includes an appli manager 14, an appli storage region 15 where a saved card appli is stored, an AID managing unit 13 where an appli identifier (AID) of a card appli is recorded, a communicating unit 12 for executing communications through a network, and a control unit 11 for controlling the trilateral communication.

The non-contact IC 20 includes an R/W 21 for performing the non-contact communication with an external R/W 30, an interface (I/F) unit 26 for executing contact communication between itself and the portable terminal 10, a card manager 22, a card appli storage region 24, a back-up data storage region 25, and an AID registering unit 23 where the AID of the card appli downloaded in the non-contact IC 20 is recorded.

In the card appli storage region 24, a card appli previously registered, a card appli acquired from an external R/W 30 through the R/W 21 or a card appli acquired from a server (not shown) through the communicating unit 12 of the portable terminal 10 is stored together with the data contained in the card appli within a permissible range in the storage capacity.

The card manager 22 manages the card appli on the non-contact IC 20 to execute the registering of AID in the AID registering unit 23, storage of the card appli in the card appli storage region 24, launching of the card appli, computing a free space in the card appli storage region 24 and selection of the card appli to be saved when the free space is insufficient, and to store the data contained in the card appli in the back-up data storage region 25 when the card appli is saved.

The registering table shown in FIG. 2(a) is kept in the AID registering unit 23. The card manager 22 records the data in the registering table and manages the card appli on the non-contact IC 20 using this table.

In the registering table, the AIDs of all the card appli's downloaded hitherto in the non-contact IC 20 are recorded as "registered AIDs" so that the "data size", "number of times of use", "card appli storage place", "data storage place" (of the data contained in the card appli) of each card appli are recorded. In the "card appli storage place", if the card appli is now stored in the card appli storage region 24, an identifier #1 indicative of the card appli storage region 24 is described, and if the card appli is saved, an identifier #2 indicative of the appli storage region 15 of the portable terminal 10 is described. Further, in the "data storage place", if the card appli is now stored in the card appli storage region 24, no identifier is described, and if the card appli is saved, an identifier #3 indicative of the back-up data storage region 25 is described.

Further, in the appli storage region 15 of the portable terminal 10, the card appli saved from the non-contact IC 20 as well as a terminal appli is stored.

The appli manager 14 manages the card appli saved from the non-contact IC 20 as well as the terminal appli so as to store the card appli in the appli storage region 15 and return the card appli to the non-contact IC 20 in accordance with a request from the non-contact IC 20.

In the AID managing unit 13, as a managing table for the card appli, the data table shown in FIG. 2(b) is preserved. On this managing table, the card appli stored in the appli storage region 15 is described by the appli manager 14.

When the non-contact IC 20 executes the non-contact communication with the external R/W 30, after the communication has been executed (or while it is executed), the control unit 11 accesses to the non-contact IC 20 through the trilateral communicating function thereby to inquire the result of the non-contact communication and request from the non-contact IC 20. Where the card appli not stored in the appli storage region 15 is requested from the non-contact IC 20, the control unit 11 acquires the card appli from the server (not shown) through the communicating unit 12 and transfers it to the non-contact IC 20.

Figure 4:
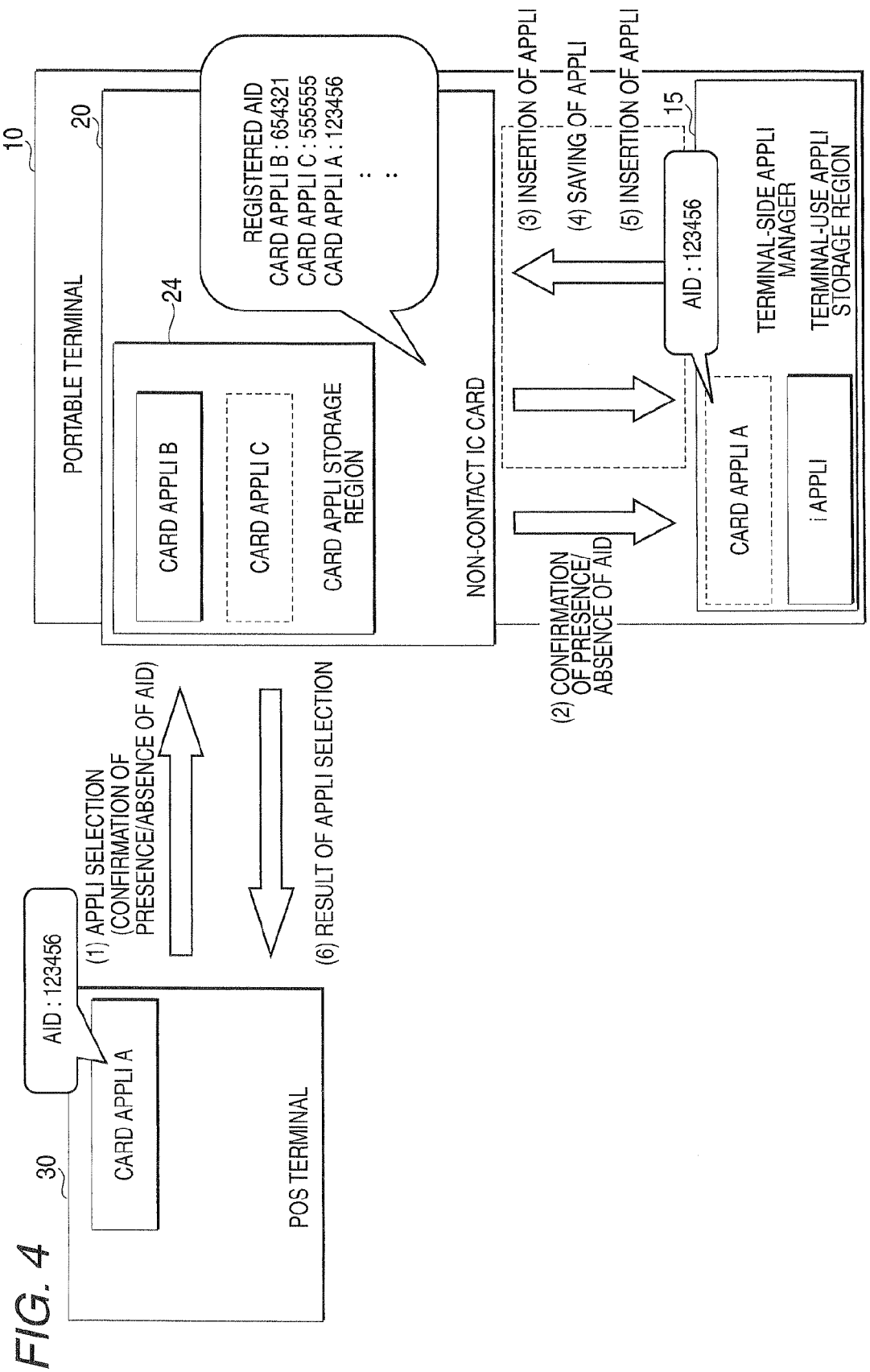
FIG. 4 is a view showing the operation of a non-contact IC incorporated portable terminal according to an embodiment of this invention (where a card appli is saved from a non-contact IC to install a necessary card appli from the portable terminal into the non-contact IC).

FIGS. 3, 4 and 5 are views each schematically showing the operation of the non-contact IC incorporated portable terminal. FIG. 3 shows, in a case where the card appli selected by a POS terminal (external R/W) 30 has been stored in the appli storage region 15 of the portable terminal 10, a procedure of transferring the card appli from the appli storage region 15 to the card appli storage region 24 of the non-contact IC 20 and installing it. FIG. 4 shows, in this case, the procedure when there is not a space for receiving the card appli in the card appli storage region 24 of the non-contact IC 20. The space of the card appli storage region 24 is created by saving another card appli stored in the card appli storage region 24 into the appli storage region 15 of the portable terminal 10. FIG. 5 shows a procedure when the card appli not preserved by the non-contact IC 20 is downloaded from the POS terminal 30. Like the case of FIG. 4, if there is not a space for receiving the card appli in the card appli storage region 24 of the non-contact IC 20, the space of the card appli storage region 24 is created by saving another card appli stored in the card appli storage region 24 into the appli storage region 15 of the portable terminal 10.

The procedure of FIG. 3 is as follows. When the portable terminal 10 is brought near to the POS terminal 30 until the non-contact IC 20 arrives at the non-contact communicating region of the POS terminal 30, the POS terminal 30 selects the card appli to be launched and notifies the non-contact IC 20 of the AID (now, AID: 123456) of the card appli thereby to confirm if or not there is the card appli (1).

The card manager 22 of the non-contact IC 20 checks the registered AIDs from the registering table. If the selected AID: 123456 is recorded as the registered AID and its storage place is the appli storage region 15 of the portable terminal 10, by the trilateral communicating function, the card manager 22 requests for the portable terminal 10 to confirm the presence or absence of the AID: 123456 (2).

When the appli manager 14 of the portable terminal 10 confirms that the AID: 123456 is registered in the managing table, it moves the card appli from the portable terminal 10 to the non-contact IC 20 so that the card appli is installed in the non-contact IC 20 (3). In this case, if there is a free space capable of receiving the card appli in the card appli storage region 24 of the non-contact IC 20, the installing is successful.

The non-contact IC 20 answers to the POS terminal 30 that the selection of the AID: 123456 is accepted (4).

Incidentally, in this case, the non-contact IC 20 may once answer for the confirmation (1) on the presence or absence of the card appli from the POS terminal 30 that "there is not the card appli". Thereafter, by the trilateral communicating function, the processing (2) and processing (3) may be executed to execute the answer of the above (4) when the confirmation on the presence or absence of the card appli is required by the POS terminal 30 again.

In the case of FIG. 4, as in the case of FIG. 3, executed are the appli selection by the POS terminal 30 (1), the confirmation on the presence or absence of the AID for the portable terminal 10 by the non-contact IC 20 (2), and the installing of the card appli (AID: 123456) from the portable terminal 10 in the non-contact IC 20 (3). However, since there is no free space for storing the card appli in the card appli storage region 24, the installing is unsuccessful. This fact is answered from the non-contact IC 20 to the portable terminal 10.

The appli manager 14 of the portable terminal 10 saves, from among the card appli's stored in the card appli storage region 24 of the non-contact IC 20, the card appli selected by the card manager 22 into the appli storage region 15 of the portable terminal 10, thereby assuring a necessary free space in the card appli storage region 24 (4).

In this case, the card manager 22 reduces the present free space in the card appli storage region 24 from the data size of the card appli with AID: 123456 thereby to compute the free space to be ensured, and adds the data size of the card appli'(s) in the order of its smaller number of times of use from among the card appli's stored in the card appli storage region 24, thereby selecting, as an object to be used, the card appli'(s) added until the total data size reaches the free space to be ensured.

Further, when the card appli(s) is saved, the card manager 22 saves the data contained in the card appli into the back-up data storage region 25.

After the appli manager 14 has ensured the necessary free space in the card appli storage region 24, installs the card appli (AID: 123456) into the non-contact IC 20 again (5).

The non-contact IC 20 with the card appli (AID: 123456) installed therein answers to the POS terminal 30 that the selection of the AID: 123456 is accepted (6).

FIG. 5 shows the procedure after the non-contact IC 20 has answered to the POS terminal 30 that "there is not the card appli" because the card appli (AID: 123456) selected by the POS terminal 30 is not included in the registered AIDs of the registering table.

The POS terminal 30 starts the processing of downloading the preserved card appli (AID: 123456) into the non-contact IC 20 (1). The card manager 22 of the non-contact IC 20 computes the free space in the card appli storage region 24 necessary for downloading the card appli (AID: 123456) (2), and if there is the necessary free space, executes the downloading. If there is not the necessary free space, the card manager 22 selects a card appli C to be saved from among the card appli's stored in the card appli storage region 24. The appli manager 14 saves the card appli C into the appli storage region 15 of the portable terminal 10 through the trilateral communicating function, thereby creating the necessary free space in the card appli storage region 24 (3).

The non-contact IC 20 answers the result of downloading of the card appli (the downloading was unsuccessful, the downloading was unsuccessful but the saving was OK, or the downloading was successful) to the POS terminal 30 (4).

If the answer from the non-contact IC 20 is "the downloading was unsuccessful but the saving was OK", the POS terminal 30 executes the downloading again. In response to this, the non-contact IC 20 answers the downloading result of the card appli (the downloading was unsuccessful, or the downloading was successful) to the POS terminal 30.

Incidentally, in this case, the non-contact IC 20 may once answer for the processing of downloading the card appli by the POS terminal 30 (1) that "there is no space". Thereafter, by the trilateral communicating function, the processing (2) and processing (3) may be executed and the POS terminal 30 may execute the processing of downloading the card appli (1) again when the necessary free space is ensured.

In this way, in the non-contact IC incorporated portable terminal, where the user shades the external R/W with the portable terminal, even if the non-contact IC does not includes the card appli necessary to enjoy the service by the external R/W, using the trilateral communicating function, the card appli can be automatically installed in the non-contact IC to enjoy the service.

The installing of the card appli is done with no user's consciousness. The installing can be also done without taking the free space of the non-contact IC into consideration.

Further, where the card appli is saved from the non-contact IC, the data contained in the card appli is preserved in the non-contact IC. This assures the safety.

It should noted that the card appli to be saved may be selected on the basis of e.g. the following standards:
(1) to select the card appli's permitting the necessary free space to be ensured with a smaller number of card appli's.
(2) if there are plural options in (1), to select the card appli with a lower frequency in use.
(3) to select the card appli in accordance with its priority set beforehand by the user.

The appli storage region 15 of the portable terminal 10 may be a memory within the portable terminal 10 or a memory card mountable in the portable terminal 10.

Further, the saving of the card appli from the non-contact IC may be limited to the case where the authentication of the non-contact IC for the portable terminal is successful. Further, the non-contact IC may permit the limitation of saving of the card appli to be released only if the authentication is successful.

This application is based on Japanese Patent Application (Patent Application No. 2005-189851) filed on Jun. 29, 2005, and the contents thereof are incorporated herein by reference.

Hitherto, the explanation has been given of various embodiments of this invention. However, this invention should not be limited to the matters described in the above embodiments, but can be changed or applied by those skilled in the art on the basis of the description of the specification and known techniques. Such changes or applications should be also included in the scope for protection.

INDUSTRIAL APPLICABILITY

The non-contact IC incorporated portable terminal according to this invention can be widely used as a portable terminal such as a cellular phone or PDA collectively having various service functions such as an electronic banking function, commuter ticket function and ticket function.

The invention claimed is:

1. A portable terminal device with a non-contact IC, comprising:
   the non-contact IC including,
      a card application storage unit configured to store one or more card applications each of which being executable, and
      a card manager configured to execute a specified card application stored in the card application storage unit when the non-contact IC performs non-contact communication with an external reader/writer, the specified card application being a card application specified by the external reader/writer; and
   a terminal application storage unit configured to store applications inclusive of the card application(s);
   wherein the card manager is further configured, when the specified card application is not stored in the card application storage unit, and
   (i) when the card application storage unit does not have a storage space for the specified card application, to create a storage space by selectively moving one or more card application(s) already stored in the card application storage unit to the terminal application storage unit, and to store the specified card application in the created storage space in the card application storage unit, and
   (ii) when the card application storage unit has a storage space for the specified card application, to store the specified card application in the card application storage unit without moving the one or snore card application(s) already stored in the card application storage unit.

2. The portable terminal device with a non-contact IC according to claim 1, wherein the specified card application to be stored in the card application storage unit is downloaded from the external reader/writer.

3. The portable terminal device with a non-contact IC according to claim 1, wherein the specified card application to be stored in the card application storage unit is installed from the terminal application storage unit.

4. The portable terminal device with a non-contact IC according to claim 1, wherein the non-contact IC further includes an application identifier registering unit in which an application identifier of each card application downloaded in the non-contact IC is registered, and the portable terminal device further includes an application identifier managing unit in which an application identifier of each card application stored in the terminal application storage unit is registered.

5. The portable terminal device with a non-contact IC according to claim 1, wherein the card application(s) to be moved from the card application storage unit is selected on the basis of the frequency of use of the card application(s).

6. The portable terminal device with a non-contact IC according to claim 1, wherein in order that the number of the card application(s) to be moved from the card application storage unit is minimum, the card application(s) to be moved is selected on the basis of the data size of the card application (s).

7. The portable terminal device with a non-contact IC according to claim 6, wherein if the card application(s) to be moved is not uniquely selected, the card application(s) to be moved from the card application storage unit is selected additionally on the basis of the frequency of use.

8. The portable terminal device with a non-contact IC according to claim 1, where the data contained in the card application(s) moved from the card application storage unit is preserved in the non-contact IC.

9. A portable terminal device with a non-contact IC, comprising:

the non-contact IC including, a card application storage unit configured to store one or more card applications each of which being executable, and a card manager configured to execute a specified card application stored in the card application storage when the non-contact IC performs non-contact communication with an external reader/writer, the specified card application being a card application specified by the external reader/writer; and a terminal application storage unit configured to store applications inclusive of the card application(s) that is selectively moved from the card application storage unit;

wherein the card manager is further configured, when the non-contact IC performs the non-contact communication with the external reader/writer, to store the specified card application in the card application storage unit by moving the specified card application from the terminal application storage unit to the card application storage unit.

10. The portable terminal device with a non-contact IC according to claim 9, wherein the non-contact IC further includes an application identifier registering unit in which an application identifier of each card application downloaded in the non-contact IC is registered, and the portable terminal device further includes an application identifier managing unit in which an application identifier of each card application stored in the terminal application storage unit is registered.

11. The portable terminal device with a non-contact IC according to claim 9, where the data contained in the card application(s) moved from the card application storage unit is preserved in the non-contact IC.

12. The portable terminal device with a non-contact IC according to claim 1, wherein the card application that has been moved into the terminal application storage unit is returned to the non-contact IC in accordance with a request from the non-contact IC.

13. The portable terminal device with a non-contact IC according to claim 1, wherein the specified card application to be stored in the card application storage unit is downloaded from a server other than the external reader/writer.

* * * * *